United States Patent
Pattikonda et al.

(10) Patent No.: US 9,448,427 B1
(45) Date of Patent: Sep. 20, 2016

(54) TRANSPARENT DISPLAY USING A POLARIZING BEAM SPLITTER

(71) Applicants: Ram Pattikonda, Plano, TX (US); Shariq Hamid, Plano, TX (US)

(72) Inventors: Ram Pattikonda, Plano, TX (US); Shariq Hamid, Plano, TX (US)

( * ) Notice: Subject to any disclaimer, the term of this patent is extended or adjusted under 35 U.S.C. 154(b) by 461 days.

(21) Appl. No.: 13/873,276

(22) Filed: Apr. 30, 2013

Related U.S. Application Data

(60) Provisional application No. 61/640,665, filed on Apr. 30, 2012.

(51) Int. Cl.
| G02F 1/13 | (2006.01) |
| G02B 27/01 | (2006.01) |
| G02F 1/01 | (2006.01) |

(52) U.S. Cl.
CPC ......... *G02F 1/1313* (2013.01); *G02B 27/0101* (2013.01); *G02F 1/01* (2013.01)

(58) Field of Classification Search
CPC .... G02F 1/1313; G02F 1/01; G02B 27/0101
USPC ......... 359/485.06, 485.07, 488.01, 601–606, 359/833, 834; 353/81; 349/57, 96
See application file for complete search history.

(56) References Cited

U.S. PATENT DOCUMENTS

| 5,579,161 A * | 11/1996 | Sekiguchi .................. 359/559 |
| 5,717,472 A * | 2/1998 | Lee ................................. 349/9 |
| 6,229,645 B1 * | 5/2001 | Hendrix .................. 359/485.02 |
| 6,290,358 B1 * | 9/2001 | Sakai et al. .................... 353/20 |
| 6,404,552 B1 * | 6/2002 | Manabe .................. 359/485.06 |
| 6,646,806 B1 * | 11/2003 | Bierhuizen .................. 359/618 |
| 6,867,830 B1 * | 3/2005 | Hirota et al. .................. 349/96 |
| 7,097,315 B2 * | 8/2006 | Li et al. .......................... 362/19 |
| 7,139,125 B1 * | 11/2006 | Mi ............................ 359/485.02 |
| 7,651,220 B1 * | 1/2010 | Pattikonda ................ 351/159.6 |
| 8,867,131 B1 * | 10/2014 | Amirparviz ............. 359/485.03 |
| 2006/0221445 A1 * | 10/2006 | DiZio et al. .................. 359/487 |
| 2010/0149533 A1 * | 6/2010 | Fest ............................. 356/367 |
| 2014/0009757 A1 * | 1/2014 | Bodkin et al. ................ 356/300 |

* cited by examiner

Primary Examiner — Frank Font
(74) Attorney, Agent, or Firm — Michael Diaz

(57) ABSTRACT

A transparent display apparatus. The apparatus includes a transparent display and a prism. The prism includes a polarizing beam splitter for splitting a received light into a first polarized light component and a second polarized light component. The prism transmits the first light component and reflects the second light component into the prism. In addition, the prism includes an optical rotator for converting the second light component to a first light component. The converted first light component is transmitted through the prism and displayed through the transparent display. In one embodiment, one or more custom prisms are used. In another embodiment, one or more cube prisms are used.

27 Claims, 20 Drawing Sheets

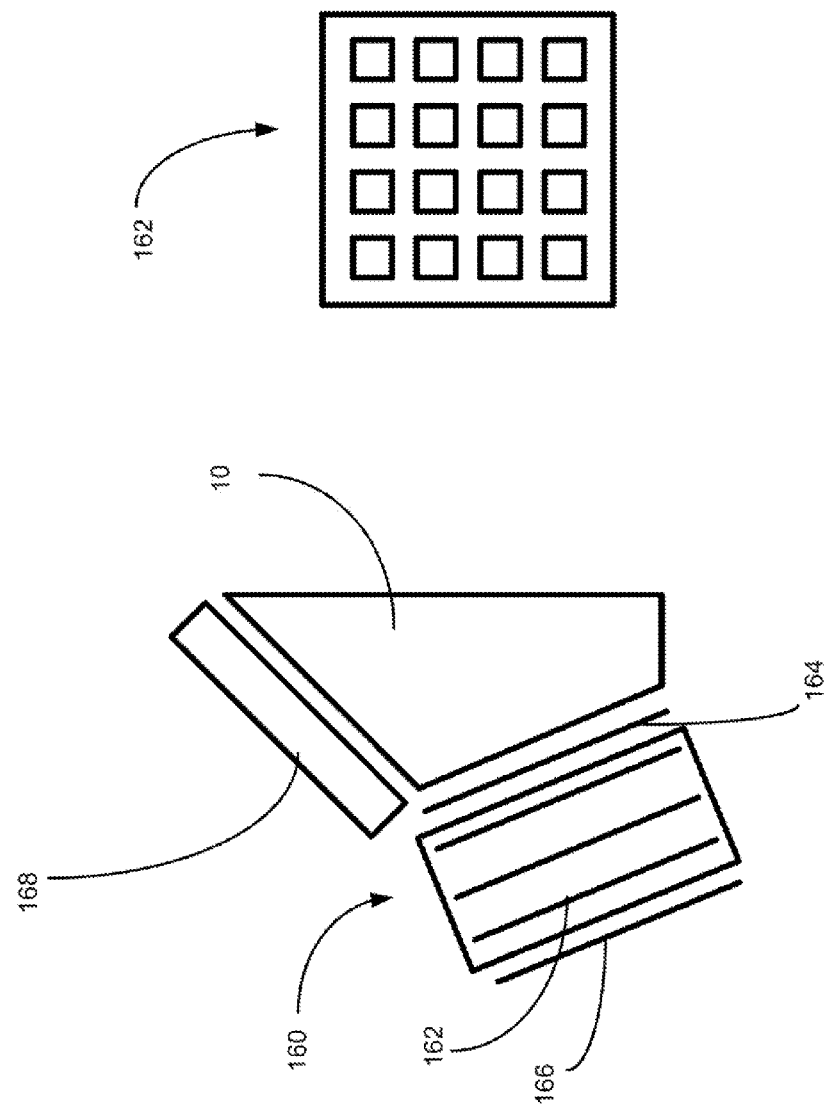

US 9,448,427 B1

TRANSPARENT DISPLAY USING A POLARIZING BEAM SPLITTER

RELATED APPLICATIONS

This utility application claims the benefit of U.S. Provisional Patent Application Ser. No. 61/640,665 by Ram Pattikonda, filed Apr. 30, 2012, and is hereby incorporated by reference.

BACKGROUND OF THE INVENTION

1. Field of the Invention

This invention relates to transparent displays. Specifically, and not by way of limitation, the present invention relates to a transparent display using a polarizing beam splitter.

2. Description of the Related Art

Glare is a frequent problem which can occur during many activities, such as during driving, flying or welding, while encountering an intense point source of light (e.g., the sun, a welding arc, or a light head-beam). U.S. Pat. No. 7,651,220 addresses this problem by using a dynamic darkening glass, such as Liquid Crystal Display (LCD) or "smart glass," with a camera monitoring the glare position and mapping it to a user's line of sight. The medium proposed in this patent has some limitations. The LCD glass loses more than half the light. The smart glass typically has a default state of opaque. The smart glass also is difficult to implement in a dot matrix grid display mode due to its higher voltage level. Furthermore, transparent displays, such as head-up display also have limitations due to non-availability of the fully clear medium that can also display information. For a head-up display to work which provides a clear view in front of the vehicle or aircraft by the driver/pilot, current technologies use reflective coatings and faint display through reflection from glass. These displays do not work well in bright sunlight. They also cannot be used for glare blocking.

It would be advantageous to have a medium that is fully transparent with minimal light loss that can also display information such as dot matrix type dots for information display and utilizing glare blocking techniques. This display would be useable for many applications such as head-up display and LCD or Liquid Crystal on Silicon (LCOS) projectors, etc. It is an object of the present invention to provide such a system and apparatus.

SUMMARY OF THE INVENTION

In one aspect, the present invention is a transparent display apparatus. The apparatus includes a transparent display and a prism. The prism includes a polarizing beam splitter for splitting a received light into a first polarized light component and a second polarized light component. The prism transmits the first light component and reflects the second light component into the prism. In addition, the prism includes an optical rotator for converting the second light component to a first light component. The converted first light component is transmitted through the beam splitter and displayed through the transparent display. In one embodiment, one or more custom prisms are used. In another embodiment, one or more cube prisms are used.

BRIEF DESCRIPTION OF THE DRAWINGS

FIG. 16 is a side view of an LC stack for light modulation and display in another embodiment of the present invention;

FIG. 17 is a front view of the segment electrodes illustrating the segment electrodes in a dot matrix style;

DESCRIPTION OF THE INVENTION

The present invention is a transparent display which utilizes a polarizing beam splitter. Existing LCD displays use polarizing glass and liquid crystal (LC) to rotate and modulate the light coming out of the polarizer. They use a second polarizer to control the transmission of the modulated light. The problem with existing polarization techniques is that more than half of the light is lost in the polarizer. After modulation losses and losses through two polarizers, the total efficiency of an LCD is typically about 35% resulting in a 65% loss of light. The present invention provides a transmission efficiency of greater than 80% using a unique prism design, polarizing beam splitter and polarizing rotator. The present invention not only achieves high transmission display using polarization merge and realignment techniques, but it also achieves it in a compact footprint.

The present invention utilizes a polarizing beam splitter to transmit the p-polarized light and reflect s-polarized (or vice versa) light both with high efficiency. The reflected s-polarized light is moved away from a p-polarization path, converted to p-polarized light using an optical rotator, such as a liquid crystal or wave-plate. The converted s-polarized light to p-polarized light is directed back to the same optical path as the original p-polarized light. This reflection, redirection, conversion and alignment of the s-polarized light are achieved through a custom shaped prism with a wedge design or a cube prism. The modulation is controlled on combined p-polarized beams or during the rotation of the s-polarized beam. The present invention may be utilized to project light or pass light to or through any type of transparent display.

Figure 1:
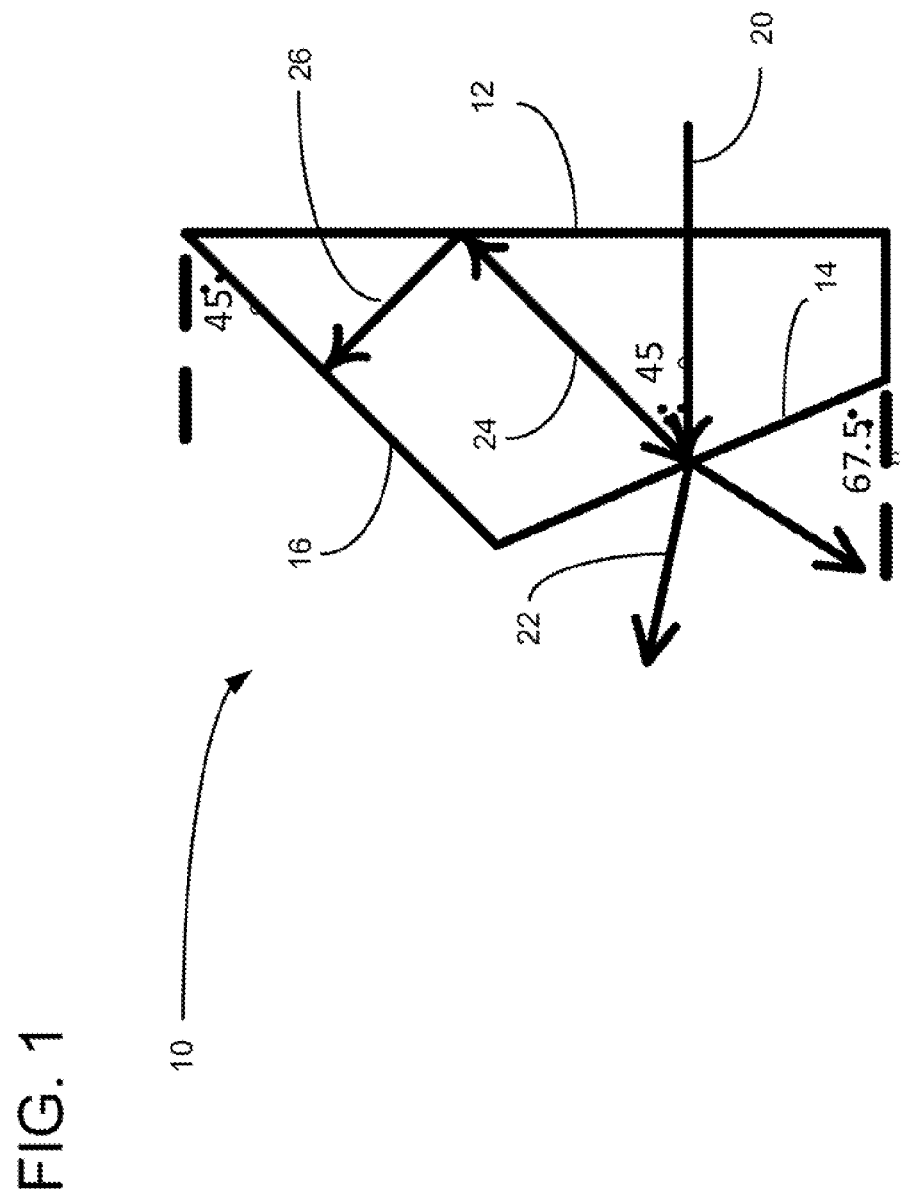
FIG. 1 is a side view of a custom prism having a first surface, a second surface, and a third surface.
Figure 2:
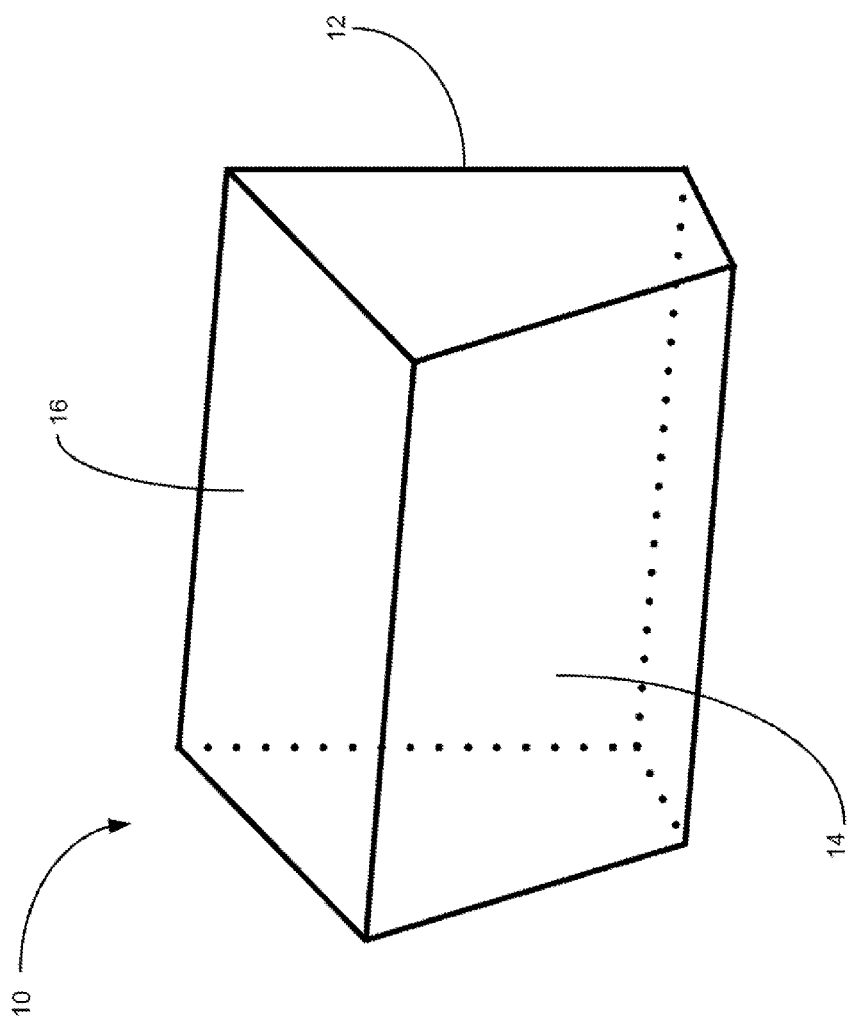
FIG. 2 is a front perspective of the custom prism of FIG. 1.

FIG. 1 is a side view of a custom prism 10 having a 1st surface 12, a second surface 14, and a 3rd surface 16. FIG. 2 is a front perspective of the custom prism 10 of FIG. 1. As shown in FIG. 1, the prism 10 has the first surface 12 oriented vertically, the second surface 14 oriented at 67.5 degrees from a horizontal axis (22.5 degrees to vertical) and the third surface 16 at 45 degrees from horizontal. It should be understood that the angles may vary and are not limited to a horizontal/vertical orientation which is shown to provide a relative orientation of each surface to each other. Light 20 enters the prism 10 through the first surface 12 and travels to the second surface 14. At the second surface 14, a polarizing beam splitter transmits the p-polarization component 22 at 22.5 degrees and reflects the s-polarization component 24 at 45 degrees. The reflected s component 24 is further reflected by the first surface 12 due to principle of total internal reflection. The first surface 12 acts as both a transmitter and reflector at the same time because of total internal reflection (TIR). The materials such as glass and acrylic have the refractive indices higher than 1.45 allowing total internal reflection for the light rays coming at greater than 42 degrees. Since the reflected light from the second surface 14 hits the first surface 12 at 45 degrees, it reflects to the third surface at 26.

Figure 3:
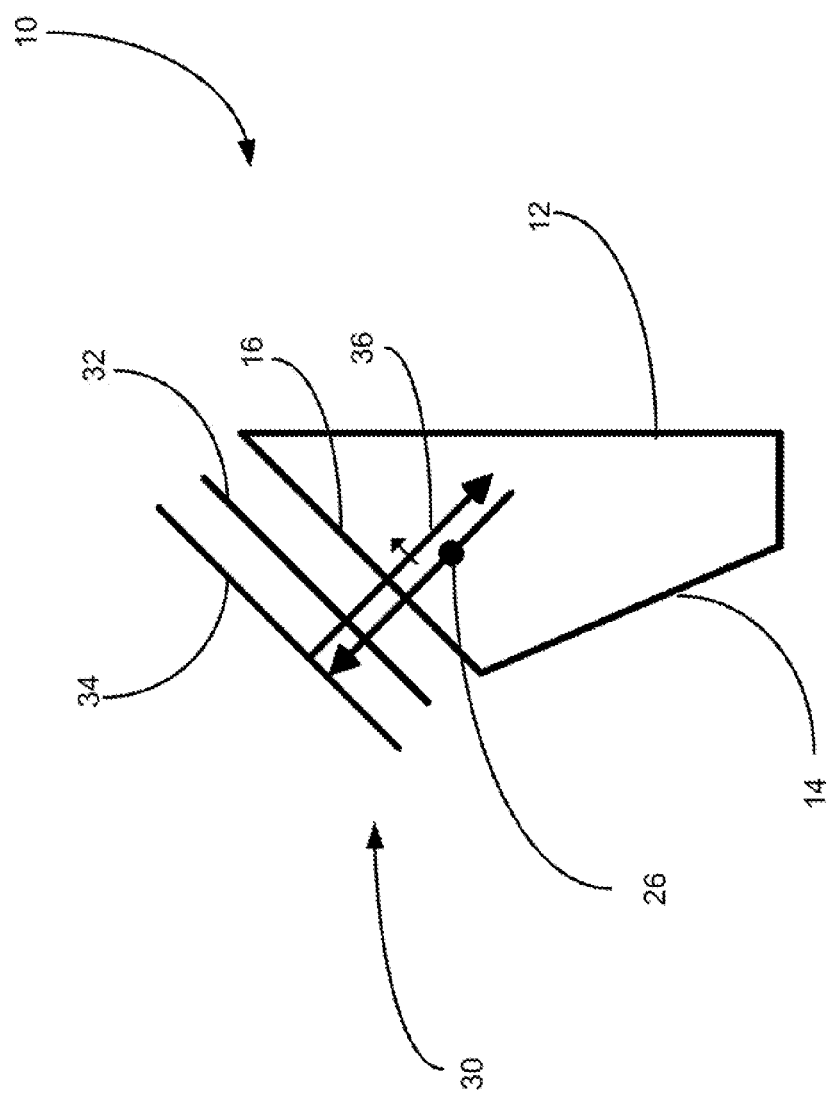
FIG. 3 is a side view of the custom prism illustrating the optical rotation and reflection at the third surface.

FIG. 3 is a side view of the prism 10 illustrating the optical rotation and reflection at the third surface 16. At the third surface 16, the prism 10 is fitted with an optical rotator 30, such as a quarter rotation plate 32 (e.g., 45 degree rotator) and mirror 34. The light (s-polarized light) 26 passes through the quarter rotation plate 32, hits the mirror 34 and comes back through the quarter rotation plate to reach the first surface a third time. Since it passes through the quarter rotator two times during its reflection, the polarization of the light is changed by 90 degrees. The s-polarized light gets converted to a p-polarized light 36 from this rotation.

Figure 4:
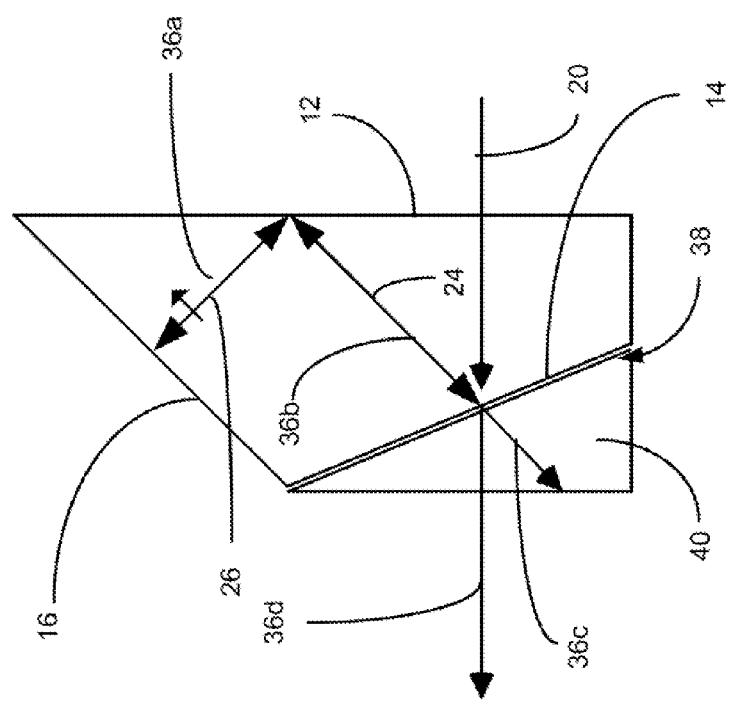
FIG. 4 is a side view illustrating the transmission of the p-polarized light.

FIG. 4 is a side view illustrating the transmission of the p-polarized light 36. As illustrated in FIG. 4, the reflected p-polarized light 36a reaches the first surface 12 a third time (a second time as reflection) and gets reflected through total internal reflection. The p-polarized light 36a is reflected to the second surface 14 (illustrated as 36b) of the prism having a polarizer beam splitter (not shown). Since this beam is now p-polarized, it transmits through the beam splitter 38 at the second surface (shown as beam 36c). The same beam that was reflected before is now transmitted. When the beam 36c leaves the second surface 14 of the prism 10, the beam 36c is refracted at an angle. A wedge 40 is used to correct the beam angle of this second P-polarized beam 36c (correct beam illustrated as 36d) and the original first transmitted P-polarized beam to a 45 degree position and horizontal positions respectively, shown as beam 36d. At the surface where both beams (beam 22 from FIG. 1 and beam 36d) meet, a diffuser plate such as holographic diffuser (not shown) may be used to display both images. The 45 degree second p-polarized light can also be redirected to the horizontal position of the original p-polarized beam using techniques discussed below.

Figure 5:
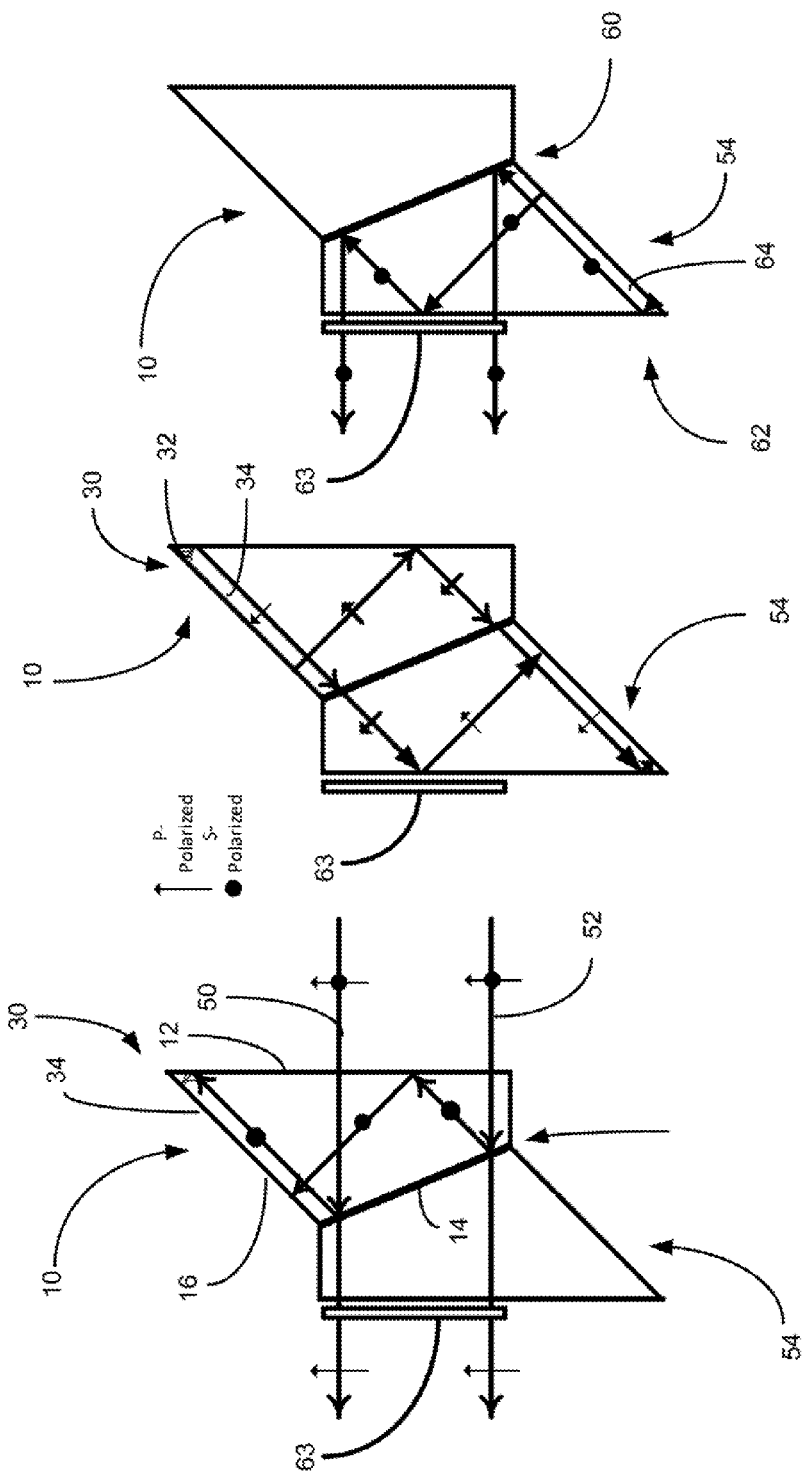
FIGS. 5A-5C are side views of full polarization transmission utilizing custom prisms.

FIGS. 5A-5C are side views of full polarization transmission utilizing custom prisms. FIGS. 5A-5C illustrates the process for getting both beams 50 and 52 into the same optical path. This method uses two custom prisms 10 and 54 joined to each other. The normal non-polarized light, which contains p and s components, enters through the first surface 12 of the prism 10. At the second surface 14, a beam splitter 60 splits the p and s-components. The p component transmits through the second surface and the S component gets reflected. The first surface 12 redirects the reflected component to the third surface 16 and its mirror 34. The mirror 34 and the rotator 30 rotate the beam from s to p polarization. The rotated p component beam hits the first surface 12 again and gets redirected to the second surface 14. At the second surface 14, the p component bean gets transmitted as it is p-polarized. This beam leaves the prism at 45 degrees to the original p component. The second prism 54 takes over for further redirection. The second prism 54 acts as a wedge to the original p-component to send the beam straight through in a horizontal direction. It also sends the second p-component at 45 degrees to the first beam. This 45 degree deflected beam gets reflected from the second surface 14 (by means of TIR) and reaches the third surface 16. At the third surface 16, another mirror 34 rotator rotate the beam from p-polarized to s-polarized beam. This converted s-polarizer beam returns its path to polarizing beam splitter (at the junction of 2 prisms). Since it is s-polarized now, it gets reflected to the original p-polarized path in a horizontal direction aligned with the original p-component. The user will see both components without losing half the polarized light as in normal polarized glass. Since both components are separated and both components are p-polarized at the junction of beam-splitter, liquid crystal can control and modulate the light as done in regular polarized LCD, but without half the light loss.

Referring to FIG. 5A and the first step, the p-polarized beam is transmitted and the s-polarized beam is reflected in the prism at the polarizing beam splitter 60. The p-polarized component light passes straight through the prism 10 and the prism 54. Referring to FIG. 5B and the second step, the mirror 34 with the quarter wave plate 32 rotates the s-polarized light 45 degrees twice to make it p-polarized. The p-polarized light returns through the prism 10 and goes to the second prism 54 reflection surface. Referring to FIG. 5C and the third step, a mirror 62 with a quarter wave plate 64 in the second prism 54 rotates light to make the light beam s-polarized. This rotated light returns its path and gets reflected by the beam splitter 60 to take the original p-polarized light. The viewer at the left of the prisms viewing the object at the right of the prisms through a transparent display 63 will view the object without 50% polarization loss and still have control transmission using Liquid Crystal (LC) and split path of both polarized beams.

Figure 6:
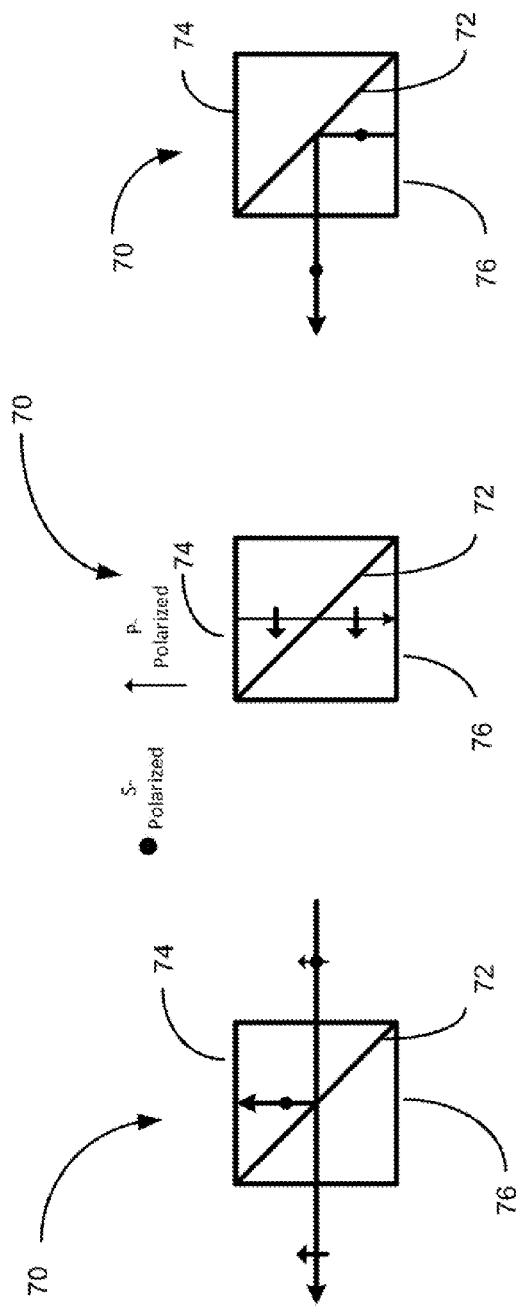
FIGS. 6A-6C illustrates a side view of a cube beam splitter in another embodiment of the present invention.
Figure 7:
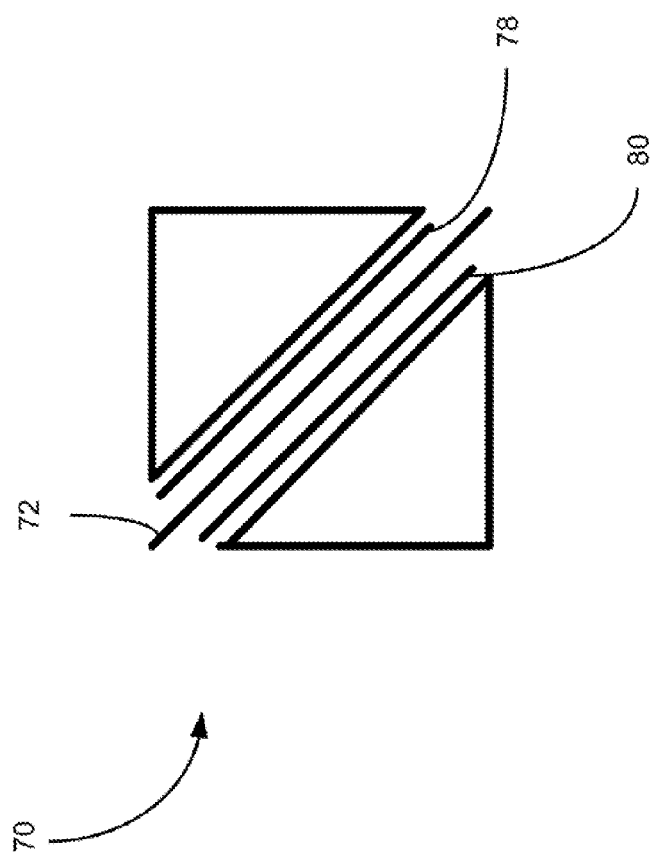
FIG. 7 is a side view of the cube beam splitter using a liquid crystal layer.

FIGS. 6A-6C illustrates a side view of a cube beam splitter 70 in another embodiment of the present invention. Specifically, FIGS. 6A-6C illustrate full polarization transmission. FIG. 7 is a side view of the cube beam splitter using a liquid crystal layer 72. On an upper end of the cube beam splitter 70 is a quarter rotate mirror 74. Additionally, a quarter rotate mirror 76 may be located on an opposite lower end of the beam splitter 70. With reference to FIG. 6A and step 1, the p-polarized beam is transmitted and the s-polarized beam is reflected in the prism at the polarizing beam splitter 70. Referring to FIG. 6B and step 2, the top mirror 74 having a quarter wave plate rotates the s-polarized light 45 degrees twice to make the light beam p-polarized. The p-polarized light returns through the beam splitter 70 and hits the bottom mirror 76. Referring to FIG. 6C and the third step, the bottom mirror 76 having a quarter wave plate rotates the light to make it s-polarized. This rotated light returns its path and is reflected by the beam splitter 70 to take the original p-polarized light. Referring to FIG. 7, the cube beam splitter 70 includes the LC layer with electrodes. The cube beam splitter may include an entry beam splitter 78 and an exit beam splitter 80.

Figure 8:
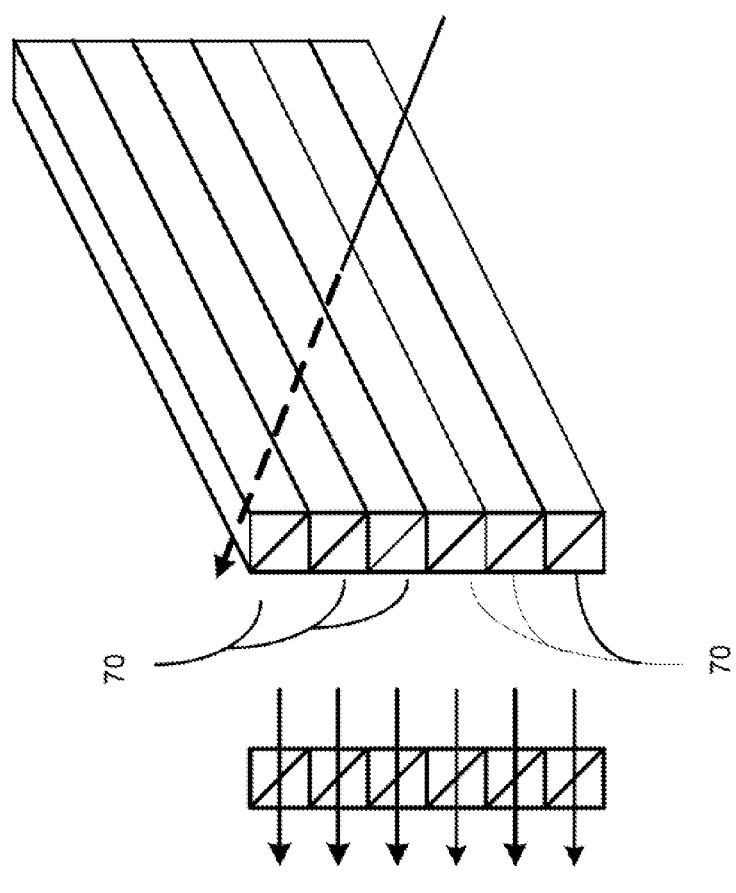
FIG. 8 illustrates a side view of a plurality of prisms.

The disadvantage with the cube approach versus the custom prism approach is that the cube uses a one inch thick device for one inch height for view, while the custom prism uses a half inch thick device for one inch height for view. Having a very thick medium for transmission or view is not desirable in many applications and typically will also increase the cost of manufacturing. This problem of thickness is solved using a unique multi cube beam-splitter approach or multi custom prism approach. FIG. 8 illustrates a side view of a plurality of prisms 70. The multiple cube splitters, which are thin, are stacked together each one acting as a separate transmission medium. In this approach, the view angle is reduced vertically as the contact area between the cubes blocks the light going at angle. This is partially improved by not using mirrors but beam splitters in the surface as discussed below.

Figure 9:
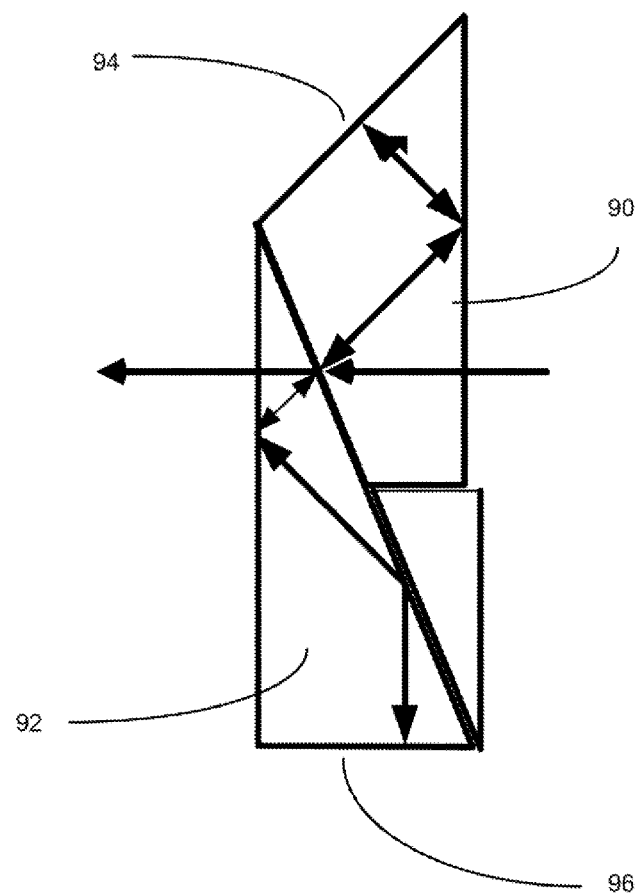
FIG. 9 is a side view of a custom prism having a large wedge in one embodiment of the present invention.
Figure 10:
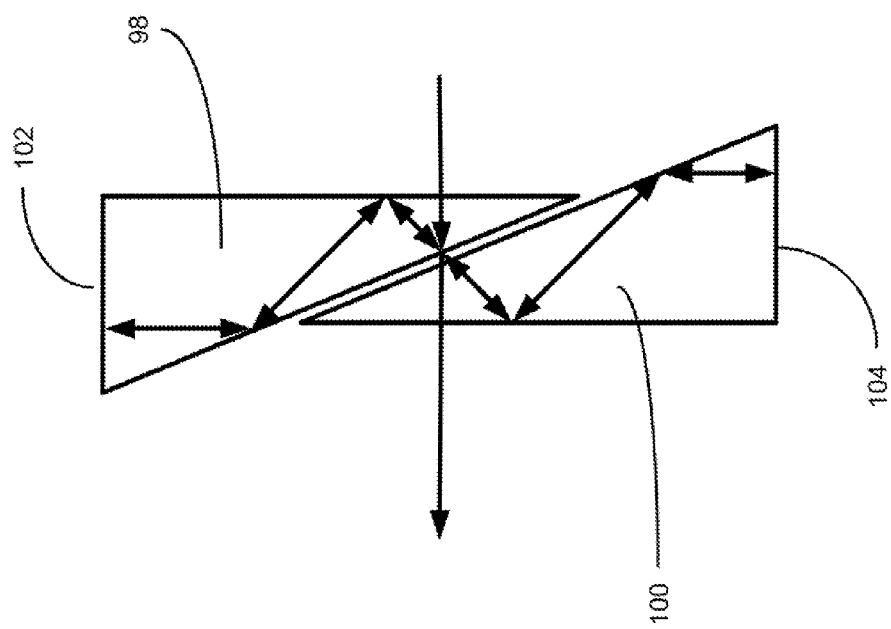
FIG. 10 is a side view of a custom prism and a large wedge in another embodiment.

In another embodiment of the present invention, the custom prism 10 may be used with a large wedge. With this embodiment, a smaller thickness may be used. Additionally, an added benefit over the double custom prism is that a second rotator mirror reflects vertically, thereby preventing blockage. FIG. 9 is a side view of a custom prism 90 having a large wedge 92 in one embodiment of the present invention. In this embodiment, the custom prism 90 includes an upper quarter rotate mirror 94. Additionally, the wedge 92 may include a quarter rotate mirror 96. FIG. 10 is a side view of a custom prism 98 and a large wedge 100 in another embodiment. The custom prism 98 may include a quarter rotate mirror 102. The large wedge may include a quarter rotate mirror 104. The present invention may use any combination of a custom prism with a large wedge having mirrors located at the upper and lower end.

Figure 11:
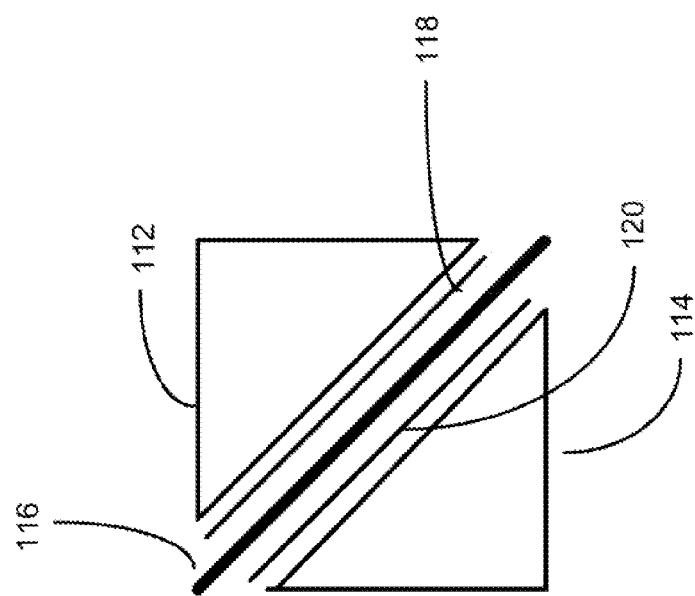
FIG. 11 illustrates a side view of two cube beam splitters with a high contrast option.
Figure 12:
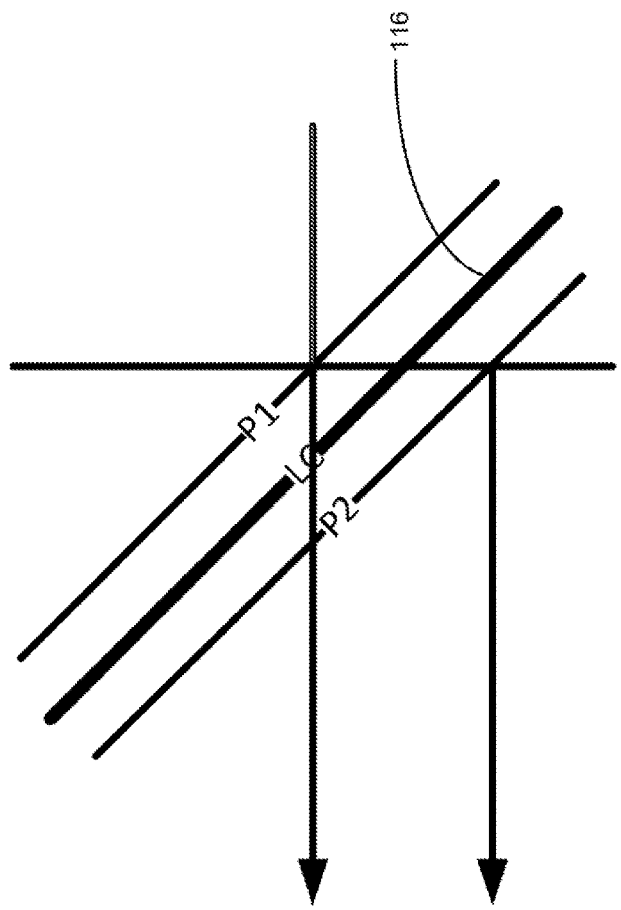
FIG. 12 is a side view of the image shift in the high contrast option.

The embodiments described above may be combined with Liquid Crystal (LC) to provide transparent LCD displays and glare blocking. Depending on the type of beam splitters, the positioning of the beam splitters and positioning of the LC layers, light can be modulated differently and different contrast options can be achieved in the display medium. FIG. 11 illustrates a side view of two cube beam splitters with a high contrast option. In this embodiment, the configuration includes an upper mirror 112, a lower mirror 114, a LC and electrode layer 116, an entry beam splitter 118, and an exit beam splitter 120. With this high contrast option, there is a slight shift of the image with 100 percent of the light being transmitter. In the embodiment illustrated in FIG. 11, the LC layer 116 is placed between the two beam splitters 118 and 120 in the prism junction. In this junction, both the light beams are p-polarized. High modulation can be achieved as the LC layer is modulating both the s and p polarized beams. But due to the two beam-splitters and angle of the beam splitters, the s and p-polarized beams are shifted by the thickness of the LC layer. By controlling this thickness to microns, the shift can be designed to stay within human recognizable distortion. FIG. 12 is a side view of the image shift in the high contrast option. In this embodiment, high transmission and high contrast may be achieved.

Figure 13:
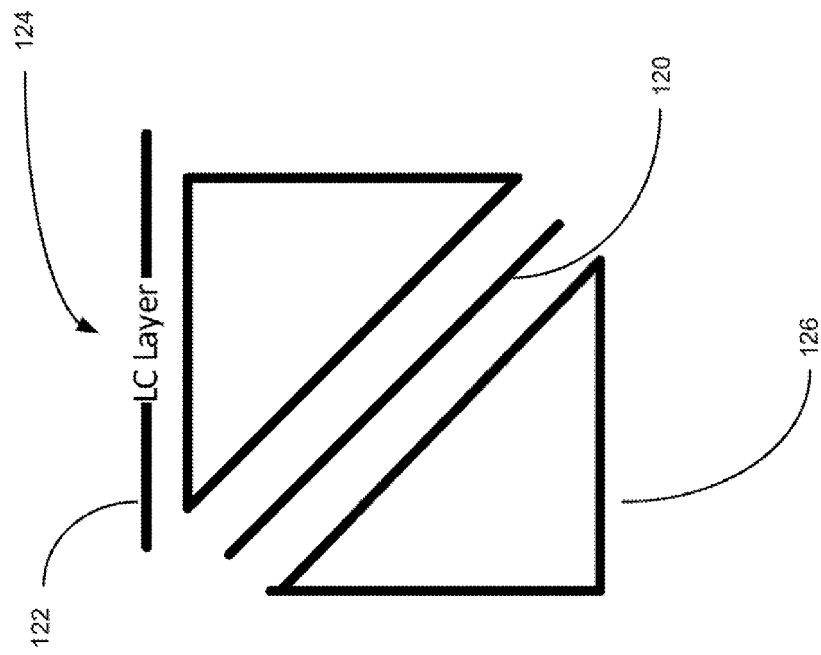
FIG. 13 is a side view of a single beam splitter.

FIG. 13 is a side view of a single beam splitter 120. In this embodiment, only one beam splitter 120 is placed at the junction of the prism. An LC layer 122 is placed in front of the top quarter rotate mirror 124. This embodiment may include a lower quarter rotate mirror 126. In an alternate embodiment, the LC layer 122 may be positioned in front of the lower quarter rotate mirror 126. In this embodiment, the LC layer is only modulating s-polarized beams. The p-polarized light transmits without any control. In this embodiment, high transmission and medium contrast can be achieved. In addition, the medium contrast option provides no shift in the image and 100 percent transmission of light.

Figure 14:
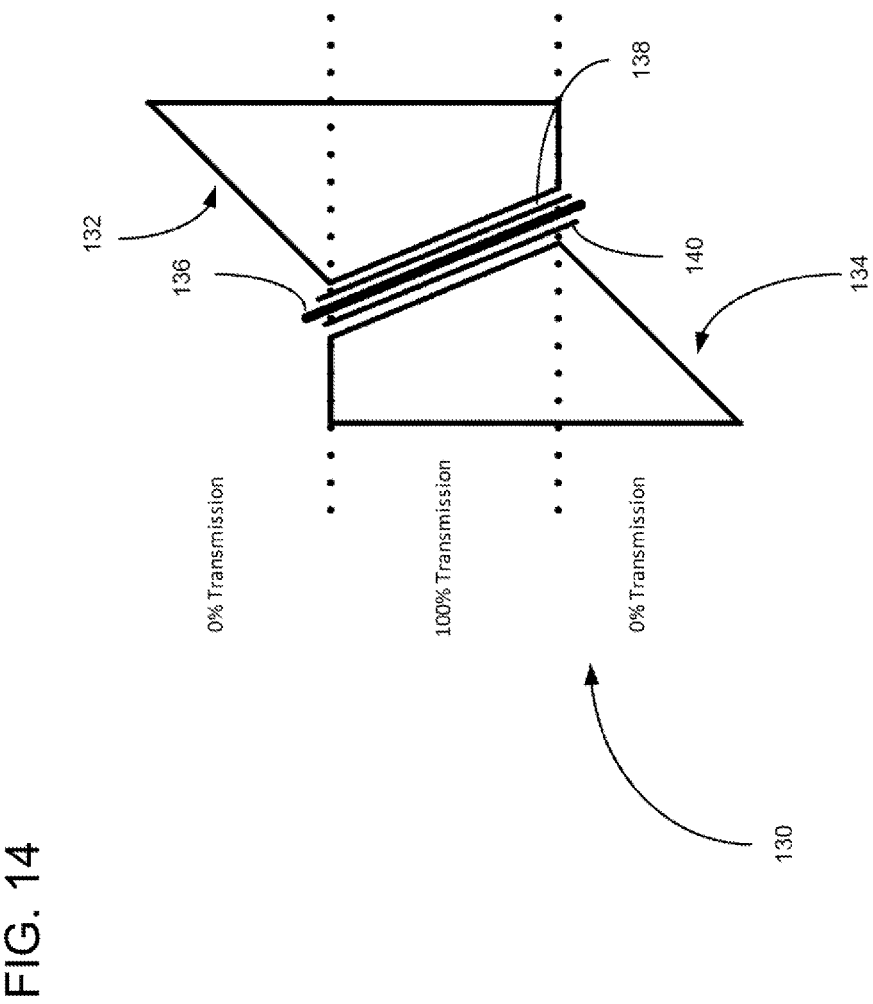
FIG. 14 illustrates a custom prism using two beam splitters with a high contrast option.

Similar results may be found by using a custom beam splitter. FIG. 14 illustrates a custom prism 130 using two beam splitters with a high contrast option. In this embodiment, the configuration includes an upper mirror 132, a lower mirror 134, a LC and electrode layer 136, an entry beam splitter 138, and an exit beam splitter 140. With this high contrast option, there is a slight shift of the image with 100 percent of the light being transmitter. In the embodiment illustrated in FIG. 14, in a similar configuration as discussed in FIG. 11, the LC layer 136 is placed between the two beam splitters 138 and 140. Both the light beams are p-polarized. High modulation can be achieved as the LC layer is modulating both s and p polarized beams. But due to the two beam-splitters and angle of the beam splitters, the s and p-polarized beams are shifted by the thickness of the LC layer. By controlling this thickness to microns, the shift can be designed to stay within human recognizable distortion.

Figure 15:
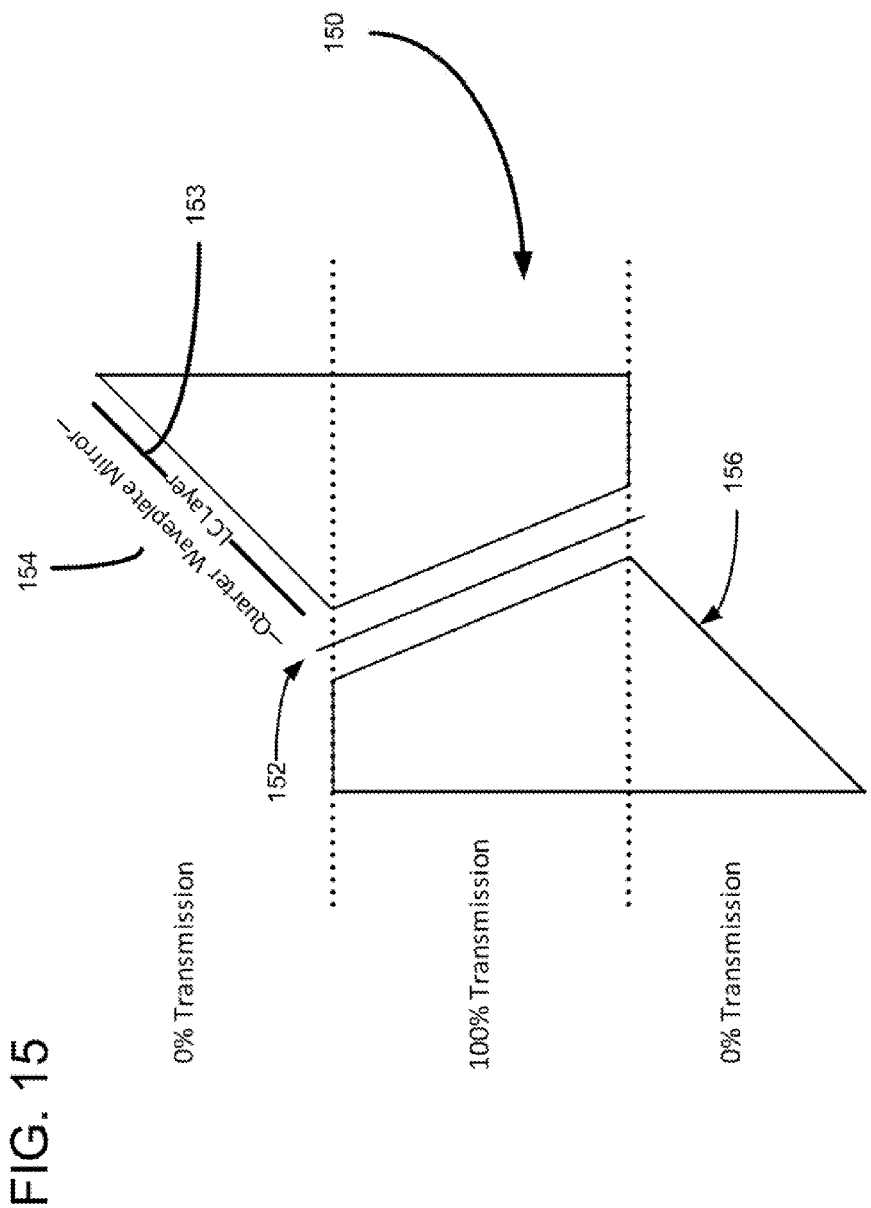
FIG. 15 is a side view of a single beam splitter with a custom prism.

FIG. 15 is a side view of a single beam splitter 150 with a custom prism 152. In this embodiment, only one beam splitter 150 is utilized. A LC layer 153 is placed in front of the top quarter rotate mirror 154. This embodiment may include a lower quarter rotate mirror 156. In this embodiment, the LC layer is only modulating s-polarized beams. The p-polarized light transmits without any control. In this design high transmission and medium contrast can be achieved. In addition, the medium contrast option provides no shift in the image and 100 percent transmission of light.

FIG. 16 is a side view of an LC stack 160 for light modulation and display in another embodiment of the present invention. The LC stack includes segment electrodes 162. An entry beam splitter 164 and an exit beam splitter 166 are located on each side of the LC stack 160. An optional second LC stack 168 may be positioned on an upper end of a prism 10. Alternatively, the prism may include a LC rotator in place of the second LC stack 168. FIG. 17 is a front view of the segment electrodes 162 illustrating the segment electrodes in a dot matrix style. This embodiment modulates both p and s polarized beams. By providing segment electrodes 162 between the LC layer, the modulation of both p and s polarized light can be controlled in a dot matrix pattern. The prism 10 with its entry beam splitter 164 transmits only the p-polarized light. The LC stack by default (with no power) rotates this light to s-polarized light. The exit beam splitter 166 is positioned so that it transmits only the s-polarized light. When the segment electrodes 162 are powered, the LC stack 160 stops the rotation of the p-polarized to s-polarized light. The exit beam splitter 166 blocks the p-polarized light. By controlling the power of each segment electrode, a dot matrix style display can be achieved for all of the s and p polarized light.

Figure 18:
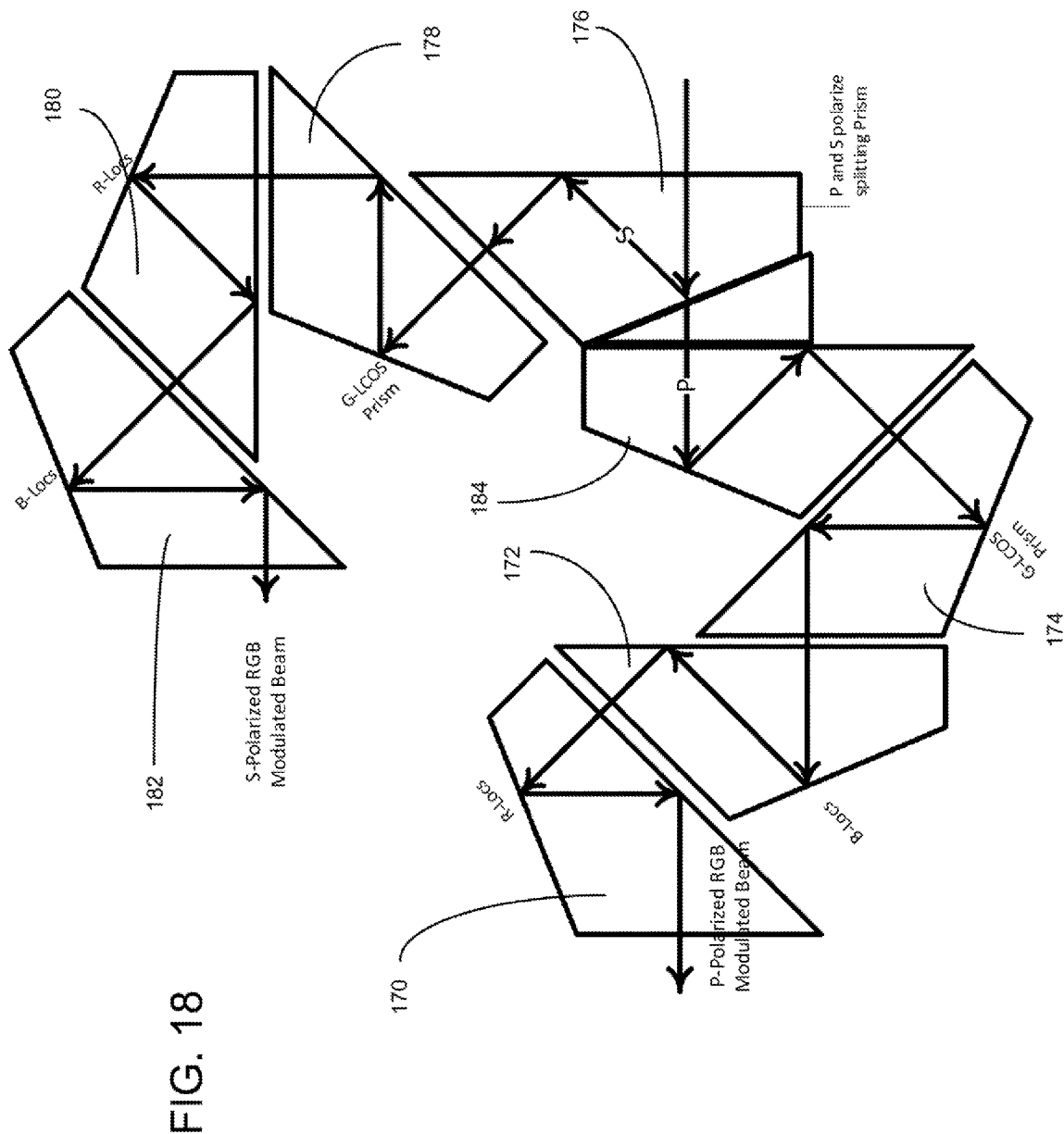
FIG. 18 is a side view of a split polarization Red, Green, Blue (RGB) projector using custom prisms.
Figure 19:
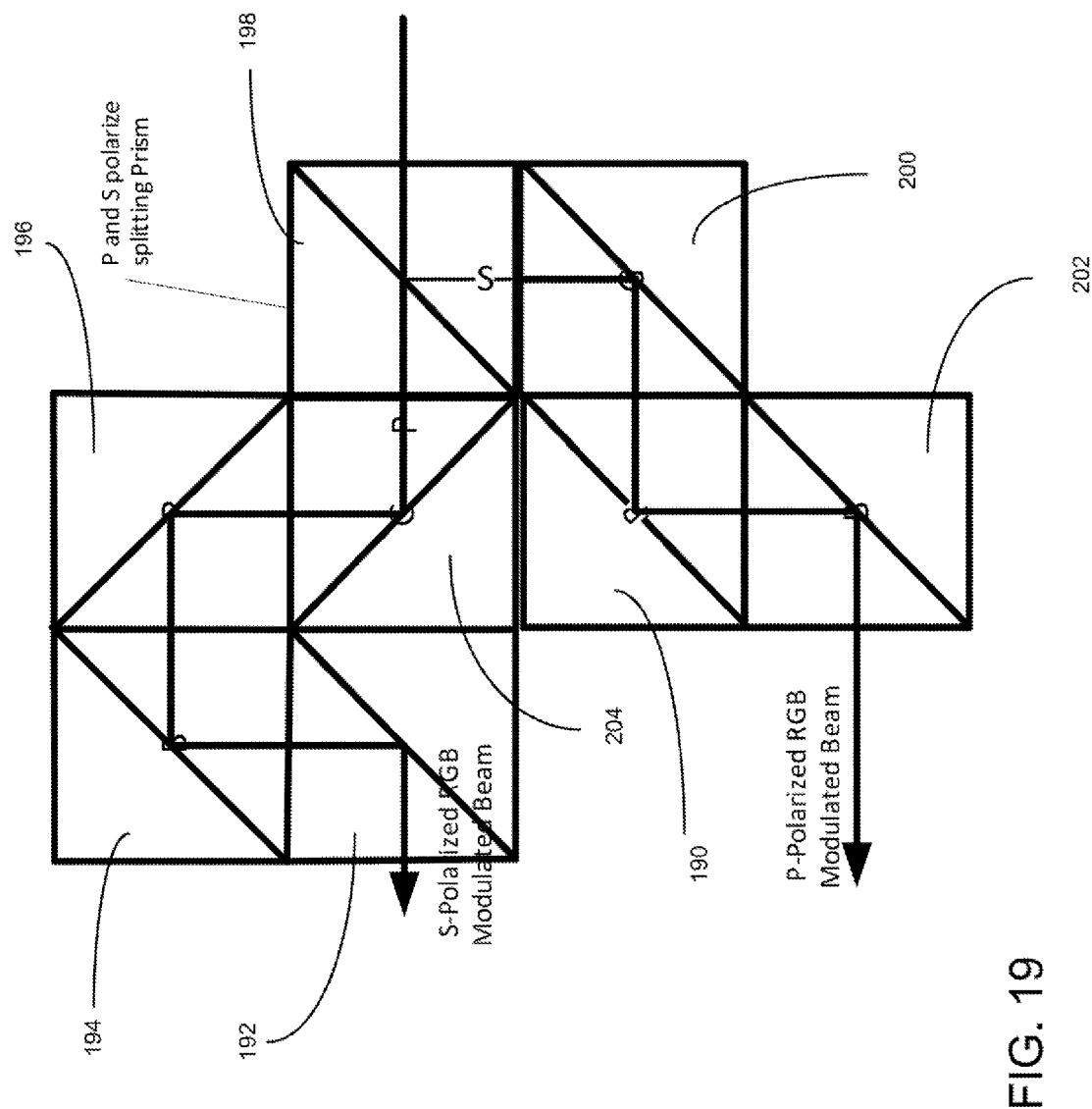
FIG. 19 is a side view of a split polarization RGB projector using a plurality of cube splitters.

In another embodiment of the present invention, multiple prisms and dichroic beam splitters may be used with the primary prism designed to produce true color high definition display. A first prism splits the light into p and s polarized beams. Each beam is carried through 3 more prisms where each prism modulates one color and reflects two other colors without modulation. The last prism in one of the p polarized paths changes the direction of light to the same as the one coming out of the s polarized path. FIG. 18 is a side view of a split polarization Red, Green, Blue (RGB) projector using custom prisms 170, 172, 174, 176, 178, 180, 182, and 184. This eight prism assembly of modulating s and p polarized lights in each color is illustrated in FIG. 18. FIG. 19 is a side view of a split polarization RGB projector using a plurality of cube splitters 190, 192, 194, 196, 198, 200, 202, and 204. FIG. 19 illustrates the configuration using cube prisms.

Figure 20:
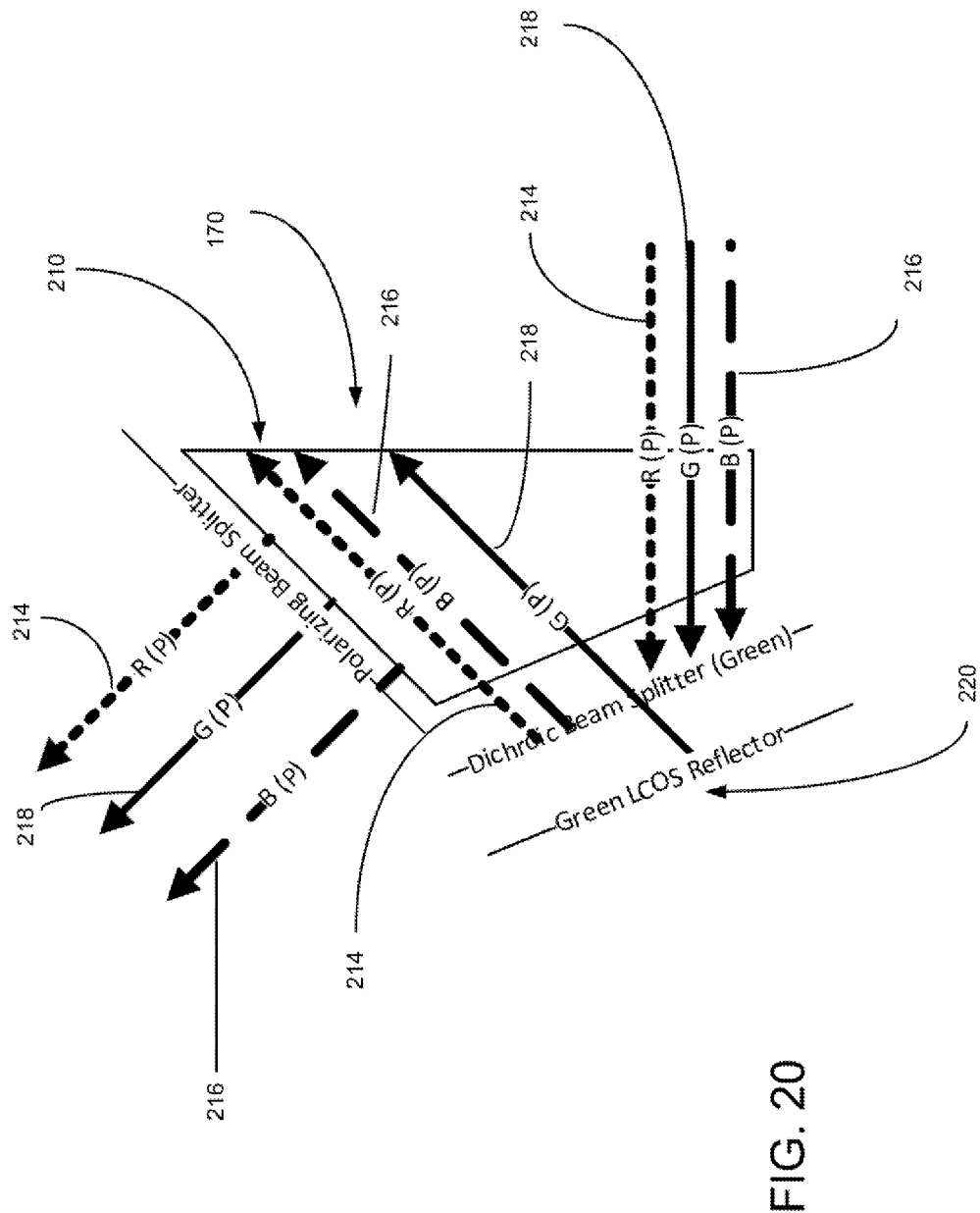
FIG. 20 illustrations the modulation in green with a p-polarizer prism.

FIG. 20 illustrations the modulation in green with a p-polarizer prism 170. The reflection of two colors and modulation of a single color in a prism is illustrated in FIG. 20 for a green channel modulation. The light enters the prism 170 in the first surface 210. It hits a dichroic filter (beam splitter) 212 where green is transmitted and red and blue light 214 and 216 are reflected. The transmitted green light 218 is modulated and reflected using a Liquid Crystal on Silicon (LCOS) reflector LCD 220. All three colors continue their path to the next prism where other colors are modulated downstream. Independently projected beams of P and S polarized beams are aligned at the lens to project at the same point on the screen. Finer adjustment of independent beams may be achieved by LCOS pixel shifting during calibration.

Figure 21:
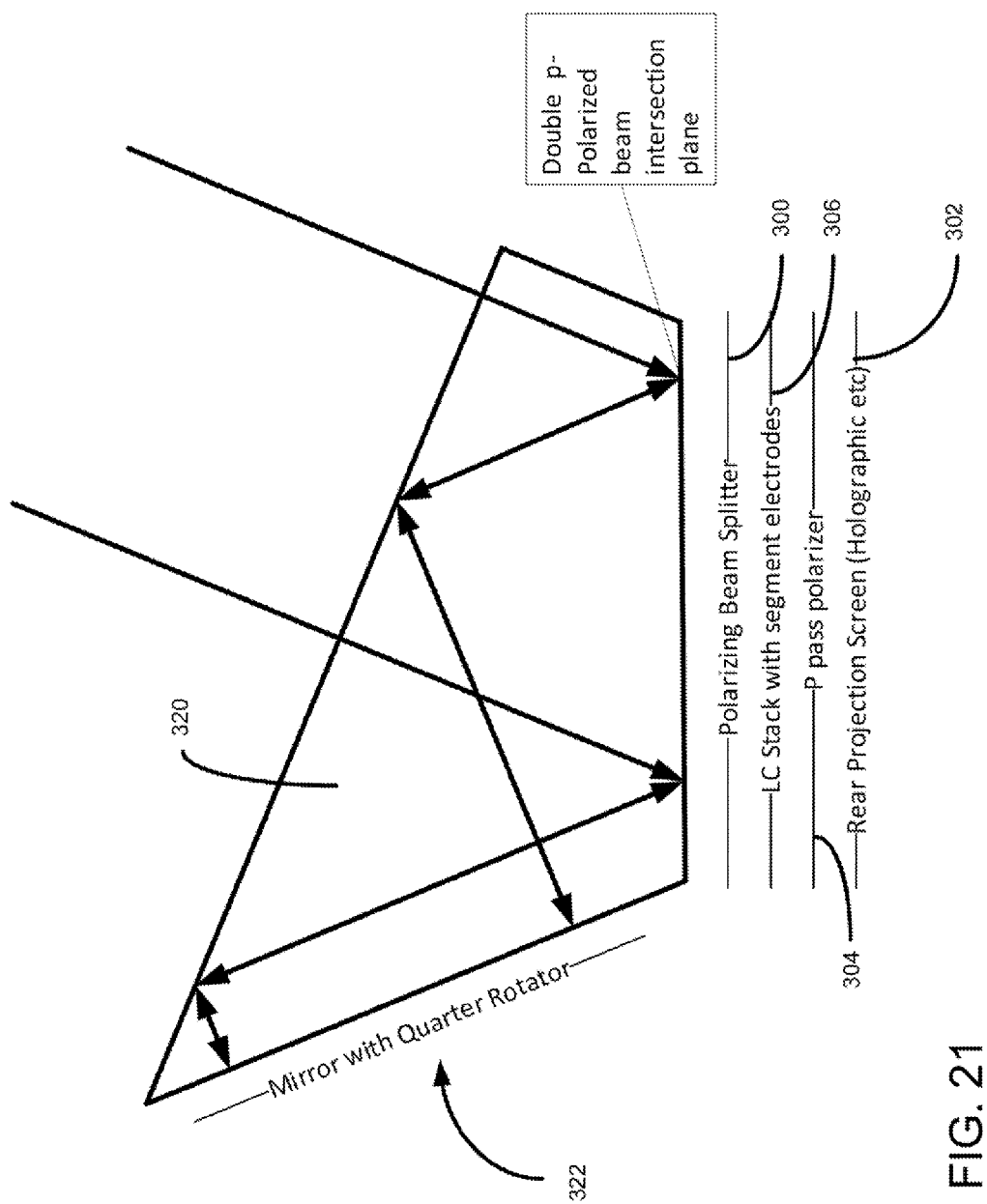
FIG. 21 is a side view of a polarizing beam splitter in an LCD based rear projection TV in one embodiment of the present invention.

In another embodiment, the present invention may be used in a LCD based rear projection TV using a polarizing beam splitter. FIG. 21 is a side view of a polarizing beam splitter 300 in an LCD based rear projection TV in one embodiment of the present invention. As depicted in FIG. 21, a rear projection screen 302 is overlaid by a p pass polarizer 304, a LC stack with segment electrodes 306, and a polarizing beam splitter 300. In addition, a prism 320 may include a mirror with a quarter rotator 322. Typical LCD rear projection televisions lose more than fifty percent of its light due to loss of half polarized light. The polarizing beam splitter 300 may be used to make a LC based rear projection TV double in its brightness and contrast. It takes advantage of the fact that p-polarized light hits the second surface of the custom prism 320 twice. The second beam hits the second surface at a different angle. This is overcome by the rear projection diffuser screen which displays the image and makes both beams seen on the screen.

The present invention may be used in a wide range of application. U.S. Pat. No. 7,651,220 discloses a glare blocking system and is hereby incorporated by reference herein. The present invention may utilized the custom or cube prism configuration with a polarizing beam splitter for full transmission of light in normal mode and full or partial blocking of light in a powered modulated mode. Additionally, a custom or cube prism with the polarizing beam splitter can not only block the glare points, but also can be used as a heads up display. The glare blocking points can also double as an information display in a heads up display configuration. Since the transparent display can transmit most of the light in normal mode and block most of the light in the modulation mode, this feature can be used as an optical shutter. Since the LCD has very fast response times, it is suited as a fast optical shutter.

The high transmission and high blocking feature of the prism may also be used as a projector in its optical path. The modulation of both the s and p polarized beams results in a high contrast and high brightness projector. The splitting of the s and p polarized beams and modulating them separately makes an exceptional mechanism for a 3D projector. The color eight prism assembly described in FIGS. 18 and 19 are capable of projecting two separate images for the left and right eyes of the view for a 3D projector.

In one embodiment, the present invention may be used as a glare free display visor having an information display coupled with an optional GPS navigation package. The glare free features, heads up display feature and high transmission features of the device can be used to display heads up GPS navigation to the user. GPS information can be overlaid with a natural view for the viewer. Additionally, in another embodiment, the glare free display visor may include a signal change detection. Since the visor may include a camera, processor and display, the visor may be used to identify signal color change from red to green and alert the user through an aural tone.

The present invention may be used with a welding helmet having a glare block with information display. The welding helmet may have a full view with blocked display of the welding arc. A camera may detect the errors in the welding and provide a guide of the welding through an information display.

The present invention may include an augmented reality heads-up display. The user may wear glasses or a helmet having a transparent prism. Relevant information may be displayed in the user's view by overlaying of the real view with the augmented superimposed display.

As discussed above, the present invention may also be used in rear projector televisions. In this embodiment, high contrast brightness may be achieved. In addition, the transparent display may be a product display shelf with transparent see-through glass with an overlay display. In still another embodiment, the transparent display is eye glasses having a heads up display or a glare blocking display.

In addition, although examples refer to s and p light components where the p light component is transmitted and the s light component is reflected, the present invention in all of the present embodiments may reverse the manipulation of the light components where the s light component is transmitted and the p light component is reflected.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A transparent display apparatus, the apparatus comprising:
    a transparent display;
    a prism;
    wherein the prism includes a polarizing beam splitter for splitting a received light into a first polarized light component and a second polarized light component, the prism transmitting the first light component and reflecting the second light component into the prism;
    wherein the prism includes an optical rotator for converting the second light component to the first light component in a same co-axial plane and in a same direction as the first light component, wherein the converted first light component is transmitted through the beam splitter;
    wherein the transmitted light is displayed through the transparent display.

2. The apparatus according to claim 1 further comprising a diffuser for displaying the transmitted light on the transparent display.

3. The apparatus according to claim 1 wherein the prism is a custom prism having a first surface, a second surface and a third surface.

4. The apparatus according to claim 3 wherein the first surface is a vertically oriented, the second surface is oriented 67.5 degrees from a vertical plane, the third surface is oriented 45 degrees from a vertical plane and the custom prism combines the second light component and the first light component using total internal reflection properties of the prism.

5. The apparatus according to claim 3 wherein the third surface of the custom prism uses light modulation to achieve a low contrast high transmission display on the transparent display.

6. The apparatus according to claim 3 wherein the third surface of the custom prism uses light modulation for glare blocking on the transparent display.

7. The apparatus according to claim 3 wherein the second surface uses light modulation to achieve a high contrast display or glare blocking on the transparent display.

8. The apparatus according to claim 1 wherein the prism having the beam splitter combines the second light component and the first light component to achieve maximum polarized light.

9. The apparatus according to claim 1 wherein the prism is a cube prism having a beam splitter to combine the second light component and the first light component using total internal reflection properties of the prism.

10. The apparatus according to claim 9 further comprising a plurality of vertically stacked prisms having a small thickness and providing a large viewing area.

11. The apparatus according to claim 9 wherein light modulation is utilized on a top surface of the cube prism for low contrast high transmission display or glare blocking on the transparent display.

12. The apparatus according to claim 9 wherein light modulation is utilized on a diagonal surface of the cube prism to achieve high contrast display or glare blocking on the transparent display.

13. The apparatus according to claim 1 wherein the prism utilizes a Liquid Crystal (LC) layer to provide a dot matrix type display on the transparent display.

14. The apparatus according to claim 1 further comprising a plurality of prisms and a plurality of Liquid Crystal on Silicon (LCOS) or Liquid Crystal Display (LCD) panels to achieve full color display or projection on the transparent display.

15. The apparatus according to claim 1 wherein the transparent display is a heads up display.

16. The apparatus according to claim 1 wherein the transparent display is a glare blocking display.

17. The apparatus according to claim 1 wherein the transparent display is an auto visor for glare blocking and displaying information.

18. The apparatus according to claim 1 wherein the transparent display is a pilot visor for glare blocking and displaying information.

19. The apparatus according to claim 1 wherein the transparent display is an auto visor capable of detecting a change of traffic signal color lights from red to green and alerting the user.

20. The apparatus according to claim 1 wherein the transparent display is a transparent medium providing a high efficiency optical shutter.

21. The apparatus according to claim 1 wherein the transparent display is a transparent medium having a head up display with augmented reality superimposed on a real time view.

22. The apparatus according to claim 1 wherein the transparent display is utilized as a glare blocking welding helmet.

23. The apparatus according to claim 1 wherein the transparent display is a product display shelf having a transparent see-through glass with an overlay display.

24. The apparatus according to claim 1 wherein the transparent display is a Liquid Crystal (LC) based Rear Projection TV using the polarizing beam splitter to achieve enhanced contrast and brightness.

25. The apparatus according to claim 1 wherein the transparent display is eye glasses having a heads up display or a glare blocking display.

26. The apparatus according to claim 1 wherein the first light component is a p light component and the second light component is an s light component.

27. The apparatus according to claim 1 wherein the first light component is an s light component and the second light component is a p light component.

* * * * *